Feb. 27, 1945.   L. J. DU MAIS   2,370,235
PORTABLE PICTURE SCREEN
Filed Aug. 28, 1943   2 Sheets-Sheet 1
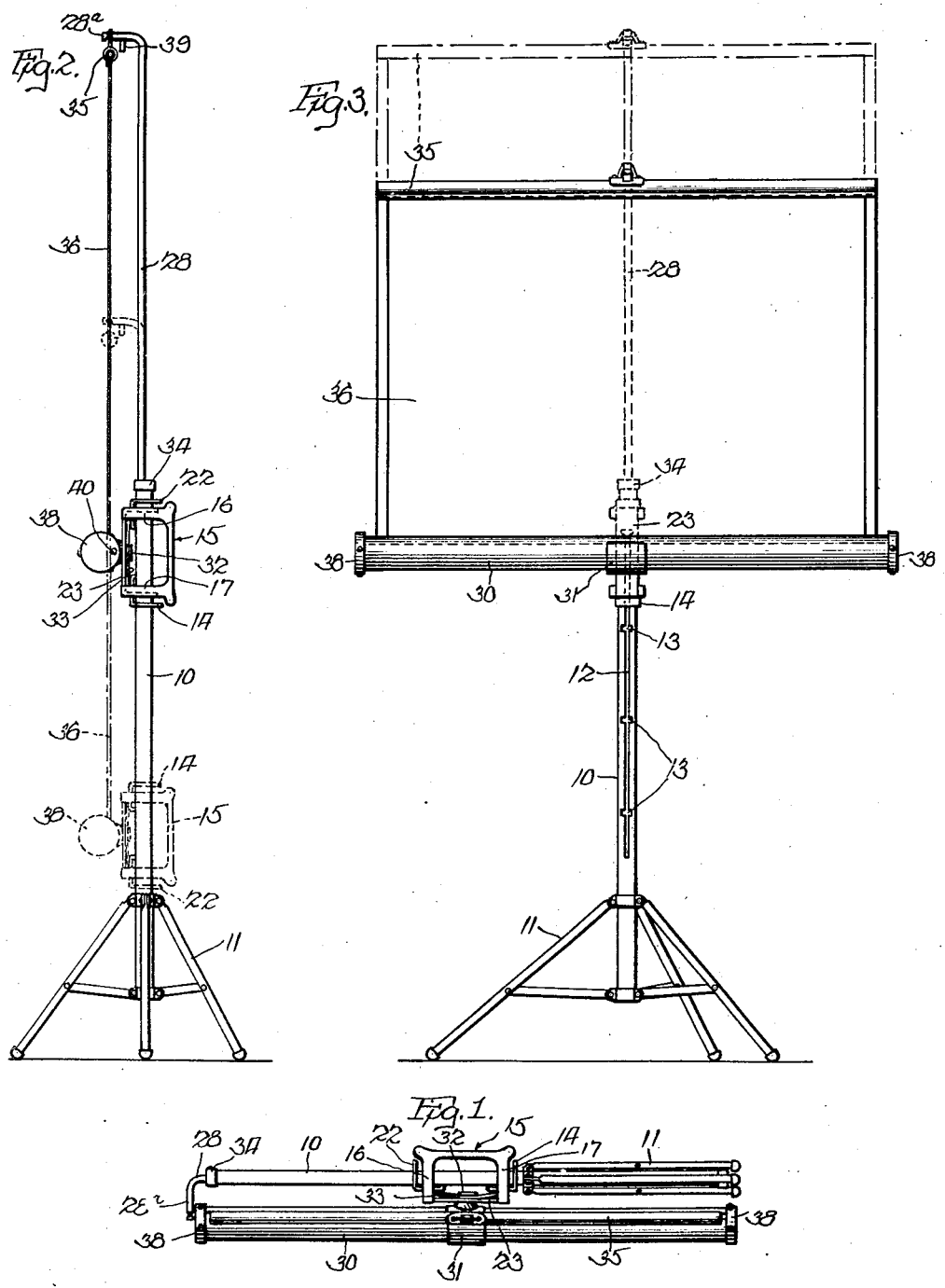
Inventor:
L. J. Du Mais.

Feb. 27, 1945.     L. J. DU MAIS     2,370,235
PORTABLE PICTURE SCREEN
Filed Aug. 28, 1943     2 Sheets-Sheet 2
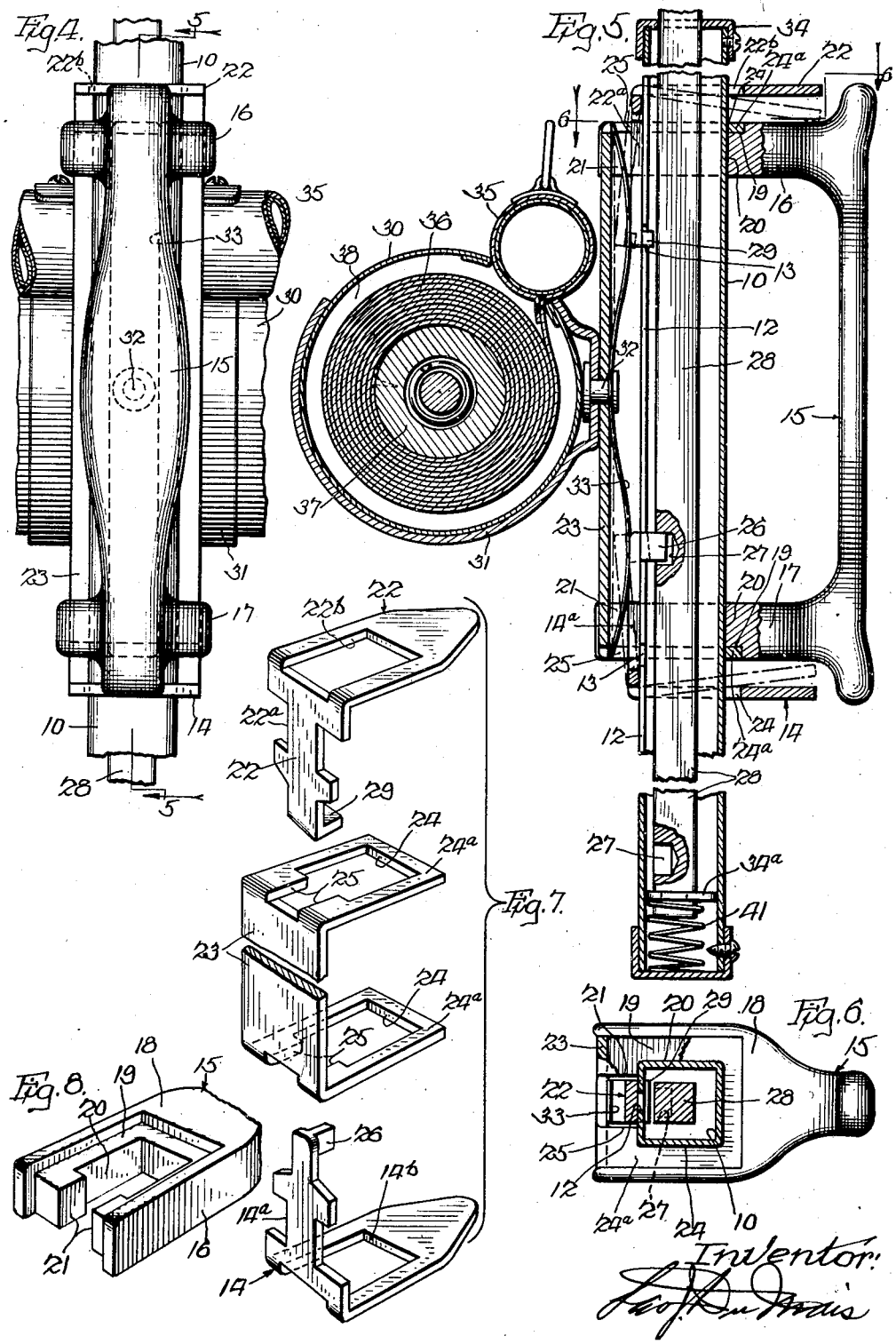

Patented Feb. 27, 1945

2,370,235

UNITED STATES PATENT OFFICE 2,370,235

PORTABLE PICTURE SCREEN

Leo J. Du Mais, Chicago, Ill., assignor to Da-Lite Screen Company, Inc., Chicago, Ill., a corporation of Illinois Application August 28, 1943, Serial No. 500,437

13 Claims. (Cl. 160—24)

The present invention relates to motion picture screen stands and is more particularly directed to an improved collapsible portable type which involves a structure wherein the picture screen is carried on a suitable reel to be extended to predetermined lengths and with the structure being such that the screen surface when exposed, will be retained in this exposed condition throughout the various heights to which the screen may be bodily adjusted for use.

In the manufacture of motion picture screens, it is found necessary to construct them with their screen surfaces in rectangular and also in the square sizes, the rectangular size being for use for general motion picture projection and the square sizes being used for film slides, glass slides, opaque slides and other types of projection slides used in stereopticon projection. As this construction will lend itself for dual purposes, the same may be constructed either in the rectangular or square sizes or to accommodate for both sizes. When the structure is set up, the predetermined exposed length of screen surface will remain in this exposed condition throughout the various heights to which the screen may be bodily adjusted.

To accomplish the above specified features, the structure is provided with a carrying handle from which the adjustments are made, the handle having means thereon with which the release of the collapsed structure is effected for setting up the same and for the adjustment of the screen when it has been opened to usable condition.

The salient features of the invention are the provision of a motion picture screen stand which is light in weight, strong and durable, and arranged to be collapsed for portable purposes and being relatively rigid when set up to support the extended screen and with means whereby the extended screen may be positioned at various heights throughout the length of the stand; the same being controlled by mechanism carried on the handle which serves as a carrying means for the structure when collapsed.

A further object is the provision of a motion picture screen stand having a main support held upright by a collapsible tripod and with a handle slidable on the support and an adjustable extension rod telescoped in the support to which the screen web may be attached to expose various lengths thereof and with the extension rod under the control of the handle for its adjustments; the handle being provided with a pair of latch means releasably connecting said support and extension rod respectively.

A further object is the provision of spring means coacting with the latching means which are operable independently for independent adjustments of the extension rod and for adjustment of the extended screen web on the structure.

A further object is the provision of spring means engageable and tensionable by the extension rod when said rod is telescoped in the support; said rod having means thereon to which the free end of the screen web is attached and also serves as a locking means for holding the screen case in locked position parallel with the support; the spring means serving to exert an upward movement on the rod when released, and to be retained in this upward condition under the tension of the spring. The extension rod being free to be extended to its first locked position while in released condition, and extended to a higher position when again released.

Other and further objects will become apparent from the ensuing description and claims.

Referring to the drawings:

Figure 1 is a view in side elevation of a structure embodying my invention, the structure being shown in collapsed condition for portable purposes.

Figure 2 is a view in side elevation illustrating the structure in set-up condition with the screen web extended to its extreme height.

Figure 3 is a face view of the structure showing the same set-up for projecting pictures of rectangular formation thereon and in dot and dash lines as raised to its entire height for square pictures.

Figure 4 is an enlarged view in rear elevation showing the handle structure and operable means coacting therewith.

Figure 5 is an enlarged detailed sectional view taken substantially on the line 5—5 of Fig. 4 and showing the rod compressible spring means at the lower end of the structure for effecting movement of the extension rod when the rod is released.

Figure 6 is a plan sectional view taken substantially on the line 6—6 of Fig. 5.

Figure 7 is an exploded detailed perspective view partially broken away illustrating the latch means and the mounting therefor.

Figure 8 is an enlarged detailed fragmentary perspective view of a portion of the handle illustrating its attachable means with the structure.

The structure comprises a standard 10 having a tripod 11 secured to the lower end thereof, and which tripod is of a collapsible structure, so as to be folded flush or parallel with the standard 10. The standard 10 is provided with an elongated slot opening 12 therein which has in its side edges, enlarged formations 13 which are arranged in pairs for receiving a latch member 14 carried on the handle 15. The handle 15 is preferably constructed of Bakelite or other suitable material and is preferably of U formation having an upper and lower horizontally extending portion 16 and 17, respectively, which are similar in construction, and it is believed a description of one will suffice for the description of both. The upper horizontal portion 16 of the handle has its top surface 18 relieved at 19 and is provided with a vertically disposed rectangular opening 20 aligned with the opening in the lower horizontal portion 17 to be slidably positioned on the standard 10. The outermost edge of the handle portions 16 and 17 are cut away at 21 to permit the positioning of the latches 14 and 22 respectively, which are guided in a mounting 23 that is of U formation and provided with a rectangular opening 24 in each horizontal portion 24a thereof and a reduced opening 25 extending therefrom, which are aligned with the openings 20—20 and 21—21 of the handle. The latches 14 and 22 are similar in construction with the exception of the engageable end portions thereof as will be presently described. The engageable portion 26 of the latch 14 is disposed vertically and is adapted to enter and slide through the elongated slot 12 of the standard 10 to engage a stop opening 27 in the extension rod 28 while the engageable portion 29 of the latch 22 is disposed horizontally and is adapted to engage the enlarged formation 13 provided at various positions along the slot opening 12 of the standard.

The mounting 23 is set in position on the handle 15 with its horizontally disposed portions 24 resting in the recessed portions 19 of the handle which aligns the openings 24 thereof with the opening 20 of the handle. Then the latches 14 and 22 are set in position through the aligned openings 24 and 20 and the reduced shank portions 14a and 22a of the latches fit into the reduced openings 25 and 21 of the mounting and handle respectively. The assembled unit is then slidably positioned over the standard 10 which extends through the openings 20—24 and through the openings 14b and 22b of the latches. This construction provides for an easy assembly of the parts and for retaining them in locked position as a unit on the structure.

The screen reel structure is carried on the mounting 23 as will be presently described.

The casing 30 is provided intermediate its length with a center-band 31 which is secured for turning movements to the mounting 23 by a rivet 32. The rivet 32 also secures a spring 33 positioned inwardly of the mounting and which extends the entire length thereof and is formed to engage and exert a tension on the latches 14 and 22, respectively, to yieldingly urge the latches 14 and 22, respectively, into the stop openings 27 of the rod 28 and into the notches 13 of the standard 10.

The extension rod 28 is slidably mounted in the standard 10 and is guided therein by a cap 34 fixed to the upper end of the standard and with a guide 34a secured to the lower end of the rod 28. When the rod is in its lowermost position, the latch 14 is urged by the spring 33 with the end 26 of the latch for engagement with a notch opening 27. When the rod is released, it is slidable the distance between the stop openings 27 to be gripped by the extension 26 of the latch which retains the rod in fixed adjusted positions with respect to the handle on which the latch is mounted. The latches are formed to project over the handle and are operable therefrom, the lower latch being operable to release the extension rod 28 and the upper latch 22 is operable for adjustment of the handle and rod bodily on the standard 10.

The extension rod 28 is formed to provide an outward projection 28a at its upper end to which the free-end 35 of the screen web 36 may be attached and which screen web is carried on a suitable reel 37 which is pivotally mounted on the end caps 38 secured to each end of the case 30. The extension rod 28 is also provided with a depending pin 39 which is adapted to enter an opening 40 provided in one of the case end caps 38 and serves to hold the case 30 aligned parallel with the standard 10 when the same is collapsed for portable purposes.

To automatically release the case, it is only necessary to effect movement of the lower latch 14 which permits the release of the extension rod 28 to be spring-impelled upwardly by the spring 41. This spring 41 will give the rod an upward impetus and hold the same in raised position with the depending pin 39 out of the opening 40 of the case end cap 38 to release the case which is then free to be swung horizontally on its pivot 32. When the case is in horizontal position, the free end 35 of the screen web may then be attached to the extension 28a to extend the screen web to a predetermined length for use. The tension of the spring 41 will retain the rod in raised position, so that after the screen is attached to the extension, the extension rod 28 may be bodily raised until a notch 27 is aligned with the engageable portion 26 of the latch 14 which is spring-urged therein to retain the rod and screen web in locked position to the distance the rod is extended.

When the screen is in this extended position, the latch 22 may be released and by gripping the handle 15, the same may be bodily moved the entire length of the standard 10 and adjusted to any desired position thereon as illustrated in Figure 2, in its lowermost position in dot and dash lines and in extreme up position in full lines. It is sometimes found desirable to extend the screen to expose a square surface for projection purposes, such as when using film slides, glass slides, opaque or stereopticon slides, and to accomplish this result, it is only necessary to again release the latch 14 which permits the disengagement thereof with the rod 28 which is free to be raised to its next notch 27 or extreme upward position as illustrated in dot and dash lines Figure 3. The extension rod 28 is limited in its upward movement by reason of the guide 34a engaging the engageable portion 26 of the latch 14. While the screen is extended to rectangular or square positions, the same may be bodily moved the entire length of the standard, between the tripod 11 and the guide cap 34, and may be locked in any desired position along the length of the standard.

When the structure is in collapsed condition, Fig. 1, the handle 15 then serves as a carrying handle and is located centrally of the length of the case 30 to permit of a uniform balance and easy carrying of the structure.

I claim:

1. In a portable collapsible motion picture screen stand, the combination of a main support, a member adjustable longitudinally thereof, a handle member slidably carried on said main support, latch means on said handle member, one of the latch means engaging the said adjustable member and a second of said latch means engaging the main support, and spring means exerting a yielding pressure on each of said latch means.

2. In a portable collapsible motion picture screen stand, comprising in combination, a tubular main support, an extension member coacting to extend said main support, a handle member slidably carried on said main support, a case pivotally carried on said handle member, a reel having a screen web coiled thereon and pivoted in the case with the free end of the web extending outwardly thereof, means on the free end of the screen web for attachment with said extension member, latch means on the handle member, one of said latch means being engageable with said extension member for supporting the same in extended position on the support with a predetermined exposed length of screen web, and a second latch means engageable with said main support for holding said handle member and extension member in adjusted positions on said main support.

3. In a collapsible motion picture screen structure of the character described, a tubular member having a longitudinally disposed slot opening therein and a plurality of stop notches in said slot opening, an extension member within said tubular member and provided with a plurality of predetermined stop openings, a handle member slidably carried on said tubular member, a pair of independently operable latch means carried by said handle member, spring means normally urging said latch means into engagement with said tubular and extension members respectively, one of said latch means extending through the slot opening of said tubular member and engageable with a stop opening in said extension member, and the second latch means being engageable with the stop notches in the slot opening of said tubular member.

4. The combination of claim 3 hereof in which there are spring means in said tubular member compressible by said extension member, said spring means being retained in compressed condition while the structure is latched in collapsed position and urging and holding said extension member in raised position when unlatched and released from its collapsed position.

5. In a motion picture screen stand of the character described, comprising, a main support, an extension member adapted to move longitudinally thereof, a handle member slidably carried on said main support, spring-urged manually operable latch means on said handle member, one of said latch means engaging and holding said extension member in normal and extended positions with respect to said handle member, and a second latch means engaging said main support for holding said handle member and extension member in adjusted position on said main support.

6. In a motion picture screen stand, comprising in combination, a tubular main suport, an extension member telescopable within said tubular main support and vertically adjustable to various heights therefrom, a handle member slidably carried on said main support, a reel having a screen web coiled thereon and pivoted on said handle member, means on the free end of said screen web for attachment with said extension member, latch means on the handle member for engagement with said extension member for supporting the same in normal and extended positions and for engagement with said main support for holding said extension member to various adjusted heights with respect to said man support.

7. In a structure of the character described, a tubular member having a longitudinally disposed slot opening therein and a plurality of stop notches in said slot, an extension member, provided with a plurality of predetermined stop openings and being slidable in the tubular member, a handle member slidable on said tubular member, a pair of independently operable spring-urged latches carried by said handle member, said latches engaging said tubular and extension members respectively, one of said latches being releasable for adjustments of the handle member on said tubular member and the other of said latches being releasable for adjustments of the extension member with respect to said tubular member.

8. In a motion picture screen stand of the character described, comprising in combination, a standard having a telescoping extension member, a handle member slidably carried on said standard, a case pivoted for turning movements on said handle member, a reel having a length of screen web thereon and being pivotally supported in the case, means at the free end of the web for attachment to said extension member, and latches on said handle member for normally holding the handle member in predetermined fixed positions on said standard and for holding said telescoping extension member in adjusted positions with respect to the handle member.

9. In a collapsible portable motion picture screen stand, comprising, a pair of telescopable members forming a support and with one of said members being adjustable with respect to the other, a handle member slidably carried on the non-adjustable member, a case pivoted on said handle member, a reel carried screen web pivotally mounted in said case and having means at its free end portion for attachment to said adjustable telescopable member, a pair of individually operated spring-urged latch means carried by said handle member, one of said latch means being for securing said handle member at predetermined positions on its coacting member, the second latch means being for engaging and holding the adjustable telescopable member at a predetermined extended position with respect to the non-adjustable member for retaining a predetermined exposed length of screen web in exposed condition.

10. In a motion picture screen stand construction, a support comprising at least two members one of which is movable longitudinally with respect to the other, a handle member slidably carried on the non-movable member and attachable to the movable member, a case pivoted for turning movements on said handle member, a reel having a length of screen web thereon and being pivotally supported in the case, means at the free end of the web for attachment to the said movable member, and latches on said handle member for releasably locking the handle member in predetermined positions on the non-movable member and for releasably locking the movable member in predetermined adjusted positions with the handle member.

11. In a collapsible portable motion picture screen stand, comprising a tubular member having a telescoping member therein forming an adjustable support, a handle member slidably carried on said tubular member, a reel carried screen web mounted in a case therefor pivoted on said handle member, means for attaching one end of the screen web extended from the case to the end of said telescoping member, latch means for securing said handle member to the tubular member, and a second latch means for securing the handle member to the telescoping member for retaining a predetermined exposed length of screen web extended from the case, said latch means being releasable independently of each other for bodily adjustments of the handle and telescoping members on the tubular member while maintaining the predetermined length of exposed screen web.

12. In a structure of the character described, the combination with a standard having supporting legs, a screen web and reel upon which said web is wound, a mounting for the reel slidable on said standard, an extension for the standard for raising and lowering the height thereof, means on said extension to which the free end of the web is detachably engaged for maintaining a predetermined length of web unwound from the reel, and means on said mounting for holding said extension in normal and extended positions and for adjustably positioning said mounting and extension on said standard.

13. In a portable collapsible motion picture screen stand, the combination of a standard, an extension for raising and lowering the height thereof, a case pivotally carried on said standard and having a reel carrying screen web therein, means on said case engageable by said extension when the case is in parallel relation with the standard for locking the case against pivotal movement, spring means compressible by said extension, latch means holding said extension locked against said spring means, said extension when released being spring-urged to release the case.

LEO J. DU MAIS.